Sept. 22, 1959   W. A. McCARTHY   2,905,622
PRODUCTION OF FUEL GAS AND LIQUID HYDROCARBON FUELS
Filed April 29, 1954
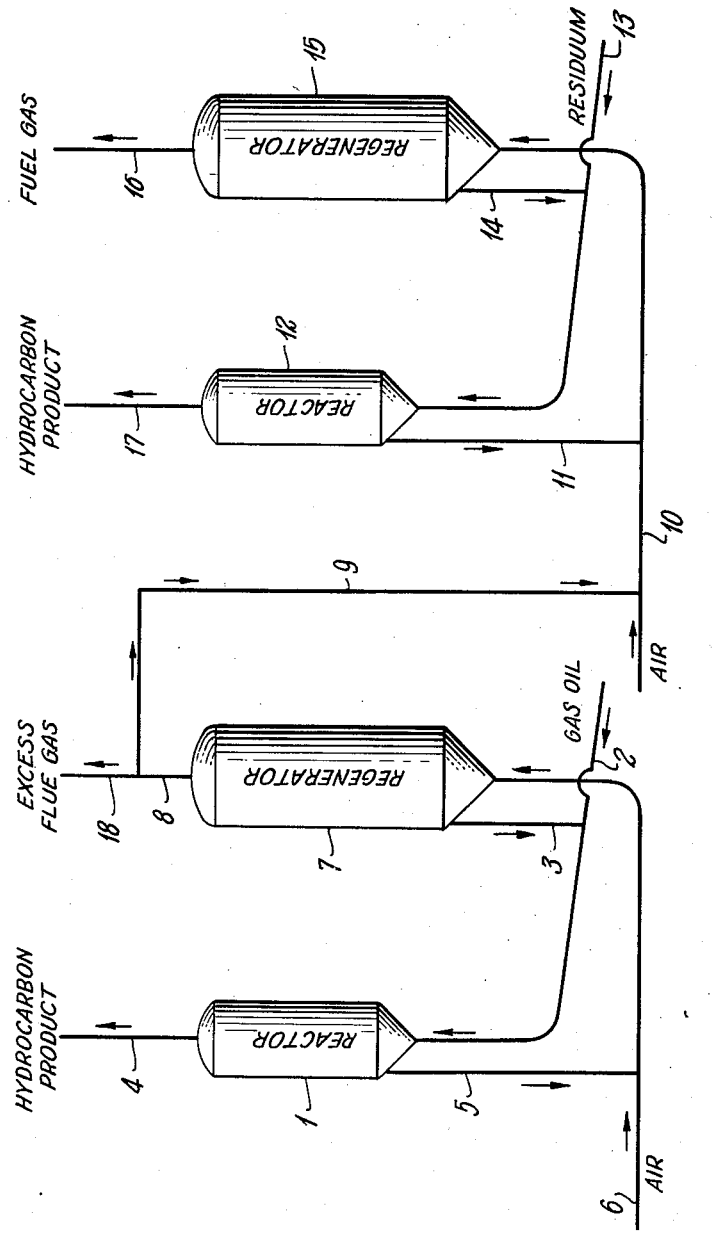
INVENTOR.
W. A. McCarthy
BY
Hudson & Young
ATTORNEYS

United States Patent Office 2,905,622
Patented Sept. 22, 1959

2,905,622

PRODUCTION OF FUEL GAS AND LIQUID HYDROCARBON FUELS

William A. McCarthy, Bartlesville, Okla., assignor to Phillips Petroleum Company, a corporation of Delaware Application April 29, 1954, Serial No. 426,489

4 Claims. (Cl. 208—78)

This invention relates to operations in which there is formed upon a contact mass or catalyst a deposit of coke or carbon resulting from an organic material containing carbon. The invention also relates to the production of a carbon-monoxide-containing fuel gas.

In one of its aspects, the invention provides a process in which a contact mass or catalyst material having thereon a deposit of coke or carbon, or composed at least in part of coke or carbon, is contacted with a deficiency of air to produce a gas comprising carbon monoxide. In another of its aspects, the invention relates to the production of such a gas from such a material by contacting the same with steam. In a specific aspect, the invention relates to a combination of operations in a fluidized coking or cracking system in which a partially used regeneration gas is used to regenerate a "spent" contact mass or material as set out above. In another specific aspect of the invention, it provides for the production of a fuel gas by providing a combination of a hydrocarbon oil cracking step in which a contact mass or catalyst is employed and is regenerated with a hydrocarbon coking operation in which a fluidized coking or a catalytic coking is effected and in which also a contact mass or catalyst, resulting from said coking operation, is regenerated, by passing partially spent regeneration gases from the regeneration of the oil cracking contact mass to the regenerator of the coking operation and in said regenerator producing said fuel gas. In another aspect still, the invention provides an operation in which there is produced a fuel gas of increased heating value by using gases, partially spent in the regeneration of a catalyst or contact mass and containing carbon dioxide and other gases, to regenerate or burn carbon from a fluidized coking unit contact mass or catalyst. Other aspects as well as the objects and advantages of the invention are apparent from this specification, the drawing and the appended claims.

The spent regeneration gases obtained from the regeneration of a "spent" contact mass of catalyst which has been employed to cause conversion of hydrocarbons do not possess desirable heating value for use as a fuel gas. This is because the amount of regeneration air or oxygen-containing gas it is necessary to use to properly burn off from the contact mass the carbon laid down thereon during the conversion step is greater than that required to result in a fuel gas. However, the spent regeneration gases which are obtained contain a substantial quantity of carbon dioxide. I have now found that such spent gases can be used to regenerate a contact mass or catalyst into which there has been disposited coke or carbon in a coking operation.

According to the invention, spent regeneration gases of relatively low B.t.u. value are used to regenerate a coking operation contact mass or catalyst and under the conditions of the regeneration the carbon dioxide contained in said gases is converted to carbon monoxide to produce a resulting gas of a fuel gas B.t.u. content.

In the drawing there is shown diagrammatically, in combination, according to the invention, a process comprising a reactor in which a gas-oil is contacted with a contact mass or catalyst to produce gasoline and accompanying hydrocarbon products; a regenerator in which the contact mass is regenerated, with an oxygen-containing gas or air to free it from substantially all of the carbon or coke laid down upon it, during the contact of said gas-oil therewith, producing a partially spent or used regeneration gas; a reactor in which a hydrocarbon material is coked in the presence of a contact mass or catalyst to produce lower-boiling hydrocarbons and accompanying hydrocarbon products; and a regenerator in which the contact mass is regenerated, with a regeneration gas at least in part consisting of said used regeneration gas, thereby producing a fuel gas of desirable heating value from said used regeneration gas.

In the step in which the spent regeneration gases are contacted with the coking catalyst or contact mass, steam may be added in addition to that steam which may be introduced as a component of the spent regeneration gases to produce hydrogen as one of the components of the fuel gas produced.

The various techniques by which the concepts of the present invention can be executed include fluidized operation, moving bed operation, fixed bed operation and suspension operation.

Referring to the drawing in which the now preferred embodiment of the invention is shown, hydrocarbon oil, in this case a gas oil suitable for catalytic cracking, is contacted as known in the art by passing it through conduit 2 to which is admitted regenerated catalyst from standpipe 3. Oil vapor and fluidized catalyst passes from conduit 2 into reactor 1 wherein conversion of the hydrocarbon oil vapors is completed and the vapors taken off overhead through conduit 4 for further treatment, for example, separation into gasoline, fuel oils of various types, etc. as well known in the art. To avoid entrainment of catalyst with the hydrocarbons leaving reactor 1 through conduit 4, cyclone separators or other equivalent equipment, not shown, will be employed.

Within reactor 1, but not shown for sake of simplicity, there are provided means for stripping the catalyst, as it leaves the reactor or before it leaves the same, of any entrained or occluded hydrocarbon vapors. The stripped catalyst is withdrawn from reactor 1 by way of conduit 5 and admixed with air or regeneration gas containing oxygen introduced to the system by way of conduit 6. The admixture travels as a fluidized mass through conduit 6 into regenerator 7 wherein carbon laid down on the catalyst is substantially completely removed therefrom. Regenerated catalyst stripped of undesirable regenerator gases, by means not shown, is then passed into conduit or standpipe 3 for use as already described. Partially used regeneration gas, or flue gas, is removed by way of conduit 8 then passed by way of conduit 9 into conduit 10 wherein it is admixed with stripped spent catalyst which is fed to conduit 10 by standpipe 11 which contains stripped spent catalyst resulting from a coking operation in reactor 12 in which a hydrocarbon oil residue is coked by admitting the same through conduit 13 into admixture with regenerated catalyst in standpipe 14 resulting from regeneration in regenerator 15 of the admixture of stripped spent catalyst and partially used regeneration gas which is formed at the juncture of conduit 10 and standpipe 11. The partially used regeneration gas as known in the art will contain carbon dioxide which in regenerator 15 in burning carbon or coke from the spent catalyst coming from reactor 12 will be converted to carbon monoxide, thus materially increasing the heat value of the gases which finally are taken off by way of conduit 16. To regulate the reaction or reactions taking place in regenerator 15, oxygen-containing gas, for example, air or steam, can be added according to the invention. When added, such gas or gases are added to conduit 10 in the now preferred embodiment of the invention. Of course, such gases can be added directly to regenerator 15.

In reactor 12 the coking operation which is conducted does not require a contact mass which, when regenerated, attains the same carbon burn-off as would be required of the catalyst in regenerator 7 and, therefore, the process possesses great flexibility in the sense that the conditions in regenerator 15 can be adjusted to primarily favor the formation of the carbon monoxide-containing fuel gas taken off through conduit 16. However, it has been found that the conditions which must be employed in regenerator 15 coincide admirably well with those which are optimum in reactor 12 and, therefore, reactor 12 can be employed, according to the invention, to obtain good yields of gasoline and related products by conversion of residual oils while at the same time producing a good fuel gas. The products formed in reactor 12 are taken off from reactor 12 by way of conduit 17 and passed to a further treatment or fractionation as desired. Blending of some or all of the products of reactor 12 with some or all of the products of reactor 1 is within the scope of the invention which, therefore, provides a unitary operation for the conversion of hydrocarbons in which a crude oil can be converted substantially completely to useful products, mainly and substantially only fuel gas and liquid hydrocarbon fuels. Thus, residual oils in the products taken off through conduit 4 can be fractionated therefrom and introduced by way of conduit 13 to the system. When so introduced, such residual oils can be admixed with topped crudes or other virgin fractions in order to regulate the kind of conversion desired in reactor 12.

In the fluidized system shown in the embodiment of the invention just described, the following conditions of operation are applicable to the oils described and generally to other oils, some adjustment or selection being necessary to obtain optimum conditions for the conversion of any specific oil fraction chosen. In reactor 1, the temperature will be in the range 890–920° F.; the pressure will be in the range 7–12 pounds per square inch gauge; catalyst residence time will be in the range of 35–75 seconds; and the weight ratio of contact mass to oil will be 4:1–7:1. Generally, the conditions in reactor 1 can be substantially those employed in the art for the cracking of oils by contact of a catalyst mass with the oil in vapor form. In the event that techniques other than fluidized technique is employed, variations and some modification, as will be understood by one skilled in the art in possession of this disclosure, may be necessary.

The operating conditions in regenerator 7, according to this invention, will be a temperature in the range of 1030–1150° F.; a pressure of 5.7–7 pounds per square inch gauge; a catalyst residence time of 12–22 minutes; and a volume of regeneration gas or air employed will be in the ratio of 1.6–2.0 s.c.f. of gas for each pound of catalyst.

The operation of reactor 12 and regenerator 15 is designed to make use of substantially all of the partially used regeneration gas in conduit 9. However, for flexibility of operation, some of the partially used regeneration gas can be removed from the system by way of conduit 18. The conditions in reactor 12 will be 890–930° F.; 7–12 pounds per square inch gauge; 4:1–8:1 catalyst to oil weight ratio. Regenerator 15 is operated under conditions selected from the ranges which follow: 1030–1150° F.; 5.7–7 pounds per square inch gauge; 2.0–6.5 s.c.f. of used regeneration gas per pound of catalyst. When steam is added, it will be added in the ratio of up to 0.8 per volume of additional air employed.

In the foregoing description, the operating ranges given are the now preferred ranges. It will be obvious to one skilled in the art in possession of this disclosure that conditions outside the stated ranges can be practiced without departing from the scope of the invention as claimed in the appended claims.

The catalysts which are applicable in reactor 1 are those which are currently employed in the art or those which can be hereinafter found to be applicable for the cracking of hydrocarbon oil vapors. Similarly the catalysts which can be employed in reactor 12 are those known in the art and by "catalyst" here and in the claims it is intended to include coked particles or other masses which can be termed "contact masses."

It should be understood that the drawing has been made simple to facilitate comprehension of the claimed invention and that pumps, valves, controllers, cyclone separators, and, indeed, all of the gadgetry which one skilled in the art can supply for the execution of the invention as herein set forth and described are, of course, impliedly included herein.

A specific example of my invention employing all of the used gases from regenerator 7 exiting therefrom by way of line 8, and additional air introduced into line 10 is presented hereinbelow: (s.c.f. equals standard cubic feet).

Reactor 1:
    Gas oil charge (line 2)—
        Barrels per hour _____ 1483
        API @ 60° F. _____ 28.3
        Initial boiling point, ° F. _____ 320
        50% evaporated, ° F. _____ 695
        Oil temperature, ° F. _____ 697
    Catalyst to oil ratio, wt. percent ____ 5.2/1.0
    Dense bed temperature, ° F. _____ 909
    Pressure, p.s.i.g. _____ 10.3
    Coke on spent catalyst (line 5), wt. percent _____ 1.60
    Coke composition, wt. percent—
        Hydrogen _____ 7.0
        Carbon _____ 93.0

Regenerator 7:
    Flue gas (Orsat) analysis (line 8), vol. percent—
        $CO_2$ _____ 12.3
        $CO$ _____ 5.9
        $O_2$ _____ 1.9
        $N_2$ _____ 79.9
                                                    100.0

S.c.f./hr. regeneration air (line 6) _____ 4,100,000
    S.c.f./hr. flue gas (line 8) _____ 4,384,400
    Dense bed temperature, ° F. _____ 1086
    Flue gas temperature (line 8), ° F. ____ 1076
    Pressure, p.s.i.g. _____ 6.4
    Coke on regenerated catalyst (line 3), wt. percent _____ 0.49

Reactor 12:
    Residuum charge (line 13)—
        Barrels per hour _____ 300
        API @ 60° F. _____ 10.0
        Oil temperature, ° F. _____ 725
    Catalyst to oil ratio, wt. percent ____ 7.5/1.0
    Dense bed temperature, ° F. _____ 925
    Pressure, p.s.i.g. _____ 10.0
    Coke on spent catalyst (line 11), wt. percent _____ 2.75
    Coke composition, wt. percent—
        Hydrogen _____ 5.0
        Carbon _____ 95.0

Regenerator 15:
Fuel gas (Orsat) analysis (line 16), vol. percent—

| | |
|---|---|
| $CO_2$ | 7.2 |
| CO | 16.5 |
| $N_2$ | 76.3 |
| | 100.0 |
| S.c.f./hr. additional air | 535,000 |
| S.c.f./hr. regeneration gas (line 9) | 4,384,400 |
| S.c.f./hr. fuel gas (line 16) | 5,260,600 |
| Net B.t.u./s.c.f. (dry) | 56 |
| Net B.t.u./s.c.f. (with reaction water) | 51 |
| Dense bed temperature, °F. | 1100 |
| Fuel gas temperature (line 16), °F. | 1075 |
| Pressure, p.s.i.g. | 6.5 |
| Coke on regenerated catalyst (line 14), wt. percent | 0.95 |

When employing my invention with a fluidized coking operation in reactor 12, the steam present in the spent regeneration gases from regenerator 7, which steam is produced during the burn-off of coke from the catalyst in regenerator 7, plus any additional steam added to the spent regeneration gases reacts with the coke in regenerator 15 to produce hydrogen and carbon monoxide which further enriches the fuel gases removed by way of conduit 16 to a value of between about 56 to 130 B.t.u. (net) per standard cubic foot of fuel gas.

Oils which may be catalytically cracked in reactor 1 of my invention include kerosenes, heating distillates, light gas oils, heavy gas oils, vacuum gas oils, solvent extracted oils, and cycle oils, or mixtures thereof. Oils which may be catalytically cracked in reactor 12 include heavy cycle oils, decant oils, fuel oils, reduced crudes, topped crudes, recycle cracked residual oils, visbroken residual oils, asphalts produced by vacuum distillations, asphalts produced by solvent fractionations, or mixtures thereof. Oils which may be coked in reactor 12 include fuel oils, reduced crudes, topped crudes, asphalts, tars, or mixtures thereof.

Reasonable variation and modification are possible within the scope of the foregoing disclosure, drawing, and the appended claims to the invention, the essence of which is that partially used regeneration gases, resulting from the regeneration of an oil cracking contact mass or catalyst, are used to regenerate a catalyst or contact mass resulting from a coking operation, thereby increasing the carbon monoxide content of said used regeneration gas rendering it suitable for use as a fuel gas. Herein in the claims the term "contact mass" is intended to include a mass catalytic in character.

I claim:

1. A process for increasing the heating value of a spent regeneration gas of relatively low B.t.u. value obtained from the regeneration of a contact mass, which has become coated with coke during the cracking of a gas oil therewith at a cracking temperature during a contact of time length sufficient to cause a desired conversion per pass, said regeneration being effected by contacting said mass at elevated temperature with an oxygen-containing medium, resulting in said gas, containing $CO_2$ and CO, the $CO_2$ being present in preponderance over the CO, which comprises the steps of using said gas in a regeneration zone operated at a temperature in the range 1030–1150° F. to regenerate a second contact mass, which has become coated with coke during the coking of a residual hydrocarbon oil to convert said oil to desirable distillate fractions, and to coke with deposits on said second contact mass, conducting said regeneration of said second contact mass under conditions so as to cause conversion of $CO_2$ in said gas to CO increasing the total CO in said gas to an extent such that it is in preponderance over the $CO_2$ therein, and recovering said gas as a gas of substantially increased heating value.

2. A process according to claim 1 wherein the $CO_2$ content of the low B.t.u. gas is approximately 12 percent and wherein the CO content of the recovered gas is approximately 16 percent.

3. A process according to claim 1 wherein the operations of cracking, coking, and regeneration are effected employing fluidized technique.

4. A process which comprises converting a gas oil in the presence of a contact mass under conversion conditions selected to produce gasoline boiling range hydrocarbons therefrom, obtaining a carbon-coated contact mass from said conversion, regenerating said contact mass in the presence of an oxygen-containing medium to burn carbon therefrom, obtaining a flue gas of relatively high $CO_2$ content and relatively low CO content, coking a residual hydrocarbon oil in the presence of a second contact mass under coking conditions to produce gasoline and gas oil boiling range hydrocarbons therefrom, obtaining a coke-coated contact mass from said coking, in a regeneration zone operated at a temperature in the range 1030–1150° F. regenerating said coke-coated contact mass using said flue gas under regeneration conditions selected to remove coke from said second contact mass, and to regenerate the same for reuse and to convert $CO_2$ in said flue gas to CO to obtain a gas of relatively high CO content and relatively low $CO_2$ content, and having an acceptable heating value, and recovering said gas of acceptable heating value.

References Cited in the file of this patent
UNITED STATES PATENTS

| | | |
|---|---|---|
| 2,284,603 | Belchetz et al. | May 26, 1942 |
| 2,388,055 | Hemminger | Oct. 30, 1945 |
| 2,393,839 | Thomas et al. | Jan. 29, 1946 |
| 2,436,041 | Gerhold et al. | Feb. 17, 1948 |
| 2,447,577 | Hemminger et al. | Aug. 24, 1948 |
| 2,527,575 | Roetheli | Oct. 31, 1950 |
| 2,710,827 | Gornowski | June 14, 1955 |